United States Patent
Kao et al.

(10) Patent No.: US 9,234,756 B2
(45) Date of Patent: Jan. 12, 2016

(54) OBJECT TRACKING DEVICE CAPABLE OF REMOVING BACKGROUND NOISE AND OPERATING METHOD THEREOF

(71) Applicant: PixArt Imaging Inc., Hsin-chu County (TW)

(72) Inventors: Ming-Tsan Kao, Hsin-chu (TW); Shu-Sian Yang, Hsin-chu (TW); Han-Ping Cheng, Hsin-chu (TW)

(73) Assignee: PIXART IMAGING INC, Hsin-Chu County (TW)

( * ) Notice: Subject to any disclaimer, the term of this patent is extended or adjusted under 35 U.S.C. 154(b) by 228 days.

(21) Appl. No.: 13/947,961

(22) Filed: Jul. 22, 2013

(65) Prior Publication Data

US 2014/0048681 A1    Feb. 20, 2014

(30) Foreign Application Priority Data

Aug. 16, 2012 (TW) .............................. 101129853 A

(51) Int. Cl.
*G01C 21/00* (2006.01)
*G06F 3/041* (2006.01)
*G06F 3/042* (2006.01)

(52) U.S. Cl.
CPC ................ *G01C 21/00* (2013.01); *G06F 3/042* (2013.01); *G06F 3/0418* (2013.01)

(58) Field of Classification Search
CPC combination set(s) only.
See application file for complete search history.

(56) References Cited

U.S. PATENT DOCUMENTS

2008/0297360 A1* 12/2008 Knox et al. .................... 340/628
2011/0133914 A1* 6/2011 Griffin et al. .................. 340/435

\* cited by examiner

*Primary Examiner* — Francis M Legasse, Jr.
(74) *Attorney, Agent, or Firm* — Hauptman Ham, LLP

(57) ABSTRACT

An optical tracking device includes a light source, an image sensor and a processing unit. The light source emits light at a lighting frequency. The image sensor outputs an operating image when the light source is being turned on and outputs a background image when the light source is being turned off. The processing unit is configured to obtain background information from the background image, calculate a differential image of the operating image and the background image, obtain object information from the differential image and compare the background information and the object information thereby removing background noise.

14 Claims, 5 Drawing Sheets

OBJECT TRACKING DEVICE CAPABLE OF REMOVING BACKGROUND NOISE AND OPERATING METHOD THEREOF

CROSS REFERENCE TO RELATED APPLICATION

This application claims the priority benefit of Taiwan Patent Application Serial Number 101129853, filed on Aug. 16, 2012, the full disclosure of which is incorporated herein by reference.

BACKGROUND

1. Field of the Disclosure

This disclosure generally relates to a human machine interface device and, more particularly, to an optical object tracking device and operating method thereof that may remove the moving background noise.

2. Description of the Related Art

The conventional optical object tracking device generally includes a light source, an image sensor and a processing unit, wherein the light source is configured to illuminate an approaching object; the image sensor is configured to capture a plurality of image frames containing the object; and the processing unit is configured to track the motion of the object according to the image frames.

However, besides the object image, the image frames captured by the image sensor may further include the ambient light image. Conventionally, in order to remove the ambient light image, the image sensor is arranged to capture bright image frames corresponding to the turning on of the light source and dark image frames corresponding to the turning off of the light source. Then, the processing unit calculates the differential image of the bright image frames and the dark image frames so as to eliminate the ambient light image. Although this denoising method can eliminate the noise caused by a fixed ambient light source, when the position of the ambient light source changes with time, the background noise can not be effectively eliminated only by calculating the differential image between the bright image frames and the dark image frames. Accordingly, the processing unit is not able to correctly track the motion of the object according to the differential image.

Accordingly, the present disclosure further provides an object tracking device and an operating method thereof that may effectively eliminate the noise caused by the moving background.

SUMMARY

The present disclosure provides an object tracking device and an operating method thereof capable of eliminating the moving background noise.

The present disclosure provides an object tracking device including a light source, an image sensor and a processing unit. The light source is configured to emit light at a lighting frequency. The image sensor is configured to output an operating image when the light source is being turned on and output a background image when the light source is being turned off. The processing unit is configured to obtain background information from the background image, to calculate a differential image of the operating image and the background image, to identify at least one object in the differential image and to remove an invalid object, which is associated with the background information and smaller than a size threshold, in the differential image.

The present disclosure further provides an object tracking device including a light source, an image sensor and a processing unit. The light source is configured to emit light at a lighting frequency. The image sensor is configured to output a first image when the light source is being turned on and output a second image when the light source is being turned off. The processing unit is configured to obtain background information from the second image, calculate a differential image between the first image and the second image, obtain object information from the differential image, and compare the background information and the object information thereby removing background noise.

The present disclosure further provides an operating method of an object tracking device including the steps of capturing a background image with an image sensor when a light source is being turned off; capturing an operating image with the image sensor when the light source is being turned on; obtaining background information of the background image with a processing unit; calculating a differential image of the operating image and the background image with the processing unit; obtaining object information of the differential image with the processing unit; and comparing the background information and the object information thereby removing background noise of the differential image.

The object tracking device of the present disclosure further includes a first storage unit configured to save the background image, the differential image, the background information, the object information and/or the size threshold.

In the object tracking device and the operating method of the present disclosure, the background information includes a background object position of at least one background object in the background image; and the object information includes an object position of at least one object in the differential image.

The object tracking device and the operating method of the present disclosure further include a second storage unit configured to save a predetermined background image, wherein before calculating the differential image the processing unit calculates a differential background image of the background image and the predetermined background image to be served as the background image for calculating the differential image; and the predetermined background image is a background image captured in a starting procedure of the object tracking device, or when the object tracking device receives an update command or detects an unusual object.

In the object tracking device and the operating method of the present disclosure, the processing unit identifies at least one pixel area in the differential image having an intensity larger than an intensity threshold as the at least one object, and identifies a pixel area in the background image having an intensity larger than an intensity threshold as the background object.

In the object tracking device and the operating method of the present disclosure, when a distance of the object position of an object from the background object position is smaller than a distance threshold and a size of the object is smaller than a size threshold, the processing unit identifies the object as background noise or an invalid object.

In the object tracking device and the operating method of the present disclosure, the processing unit is further configured to perform object tracking according to the differential image from which the invalid object has been removed; that is, the processing unit performs the object tracking according to the object having the object position distanced from the background object position larger than the distance threshold.

The object tracking device according to the embodiment of the present disclosure is configured to eliminate the noise caused by the moving background and thus is suitable for being disposed on movable devices or equipments, such as being disposed on a vehicle or a portable electronic device.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
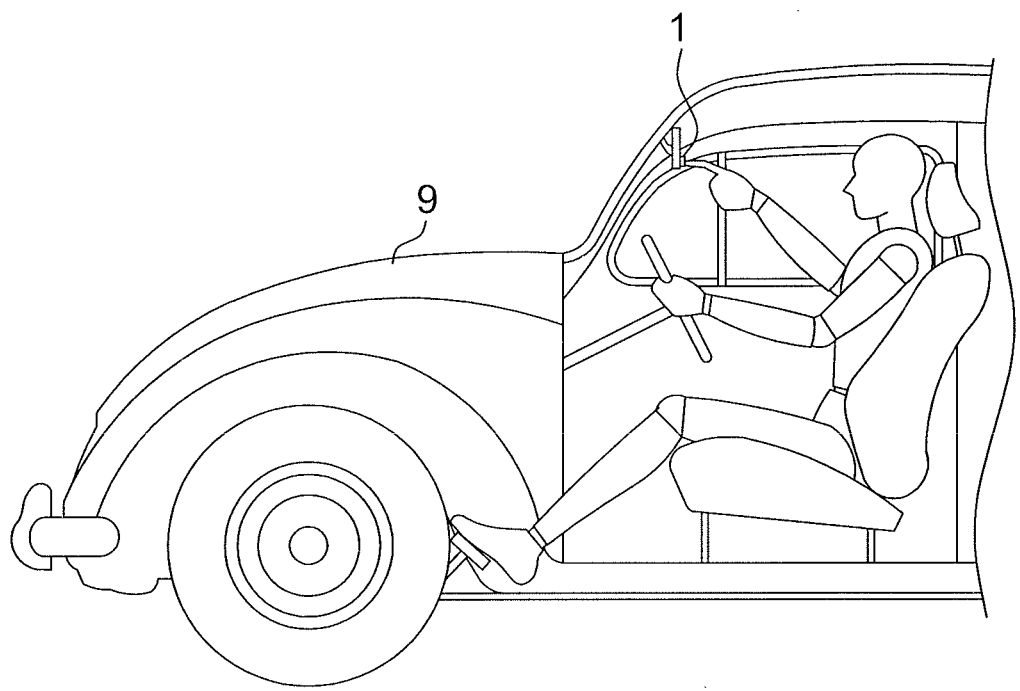
FIGS. 1A and 1B show applications of the object tracking device according to the embodiment of the present disclosure.
Figure 1B:
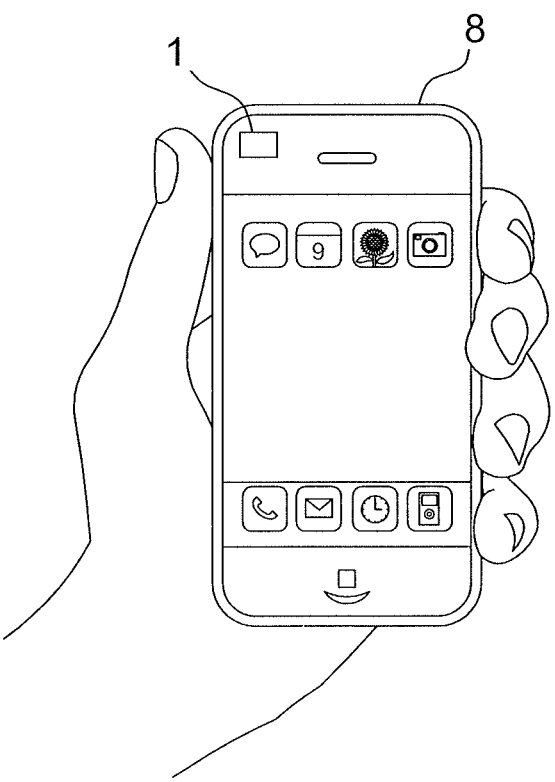

Referring to FIGS. 1A and 1B, they show applications of the object tracking device according to the embodiment of the present disclosure. As the object tracking device 1 of the present disclosure is configured to remove the moving background noise, it is suitable to be adapted to movable devices or equipments. For example, the object tracking device 1 may be disposed on a vehicle 9 (as shown in FIG. 1A) or a portable electronic device 8 (as shown in FIG. 1B), wherein the disposed positions of the object tracking device 1 in FIGS. 1A and 1B are only exemplary. It is appreciated that the object tracking device 1 may also be adapted to devices or equipments having a fixed position and is not limited to those shown in FIGS. 1A and 1B.

Figure 2:
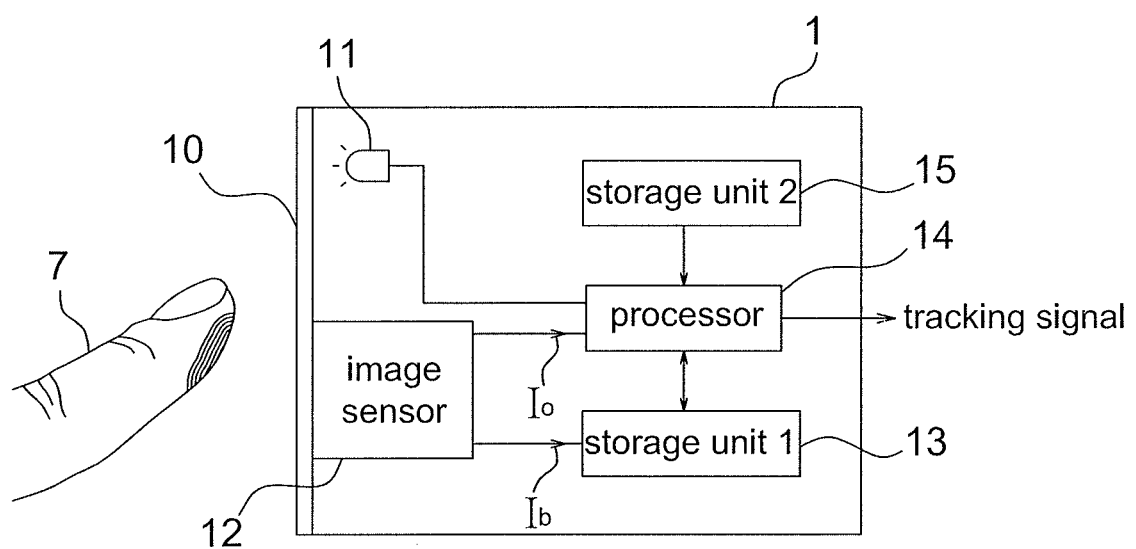
FIG. 2 shows a schematic block diagram of the object tracking device according to an embodiment of the present disclosure.
Figure 3:
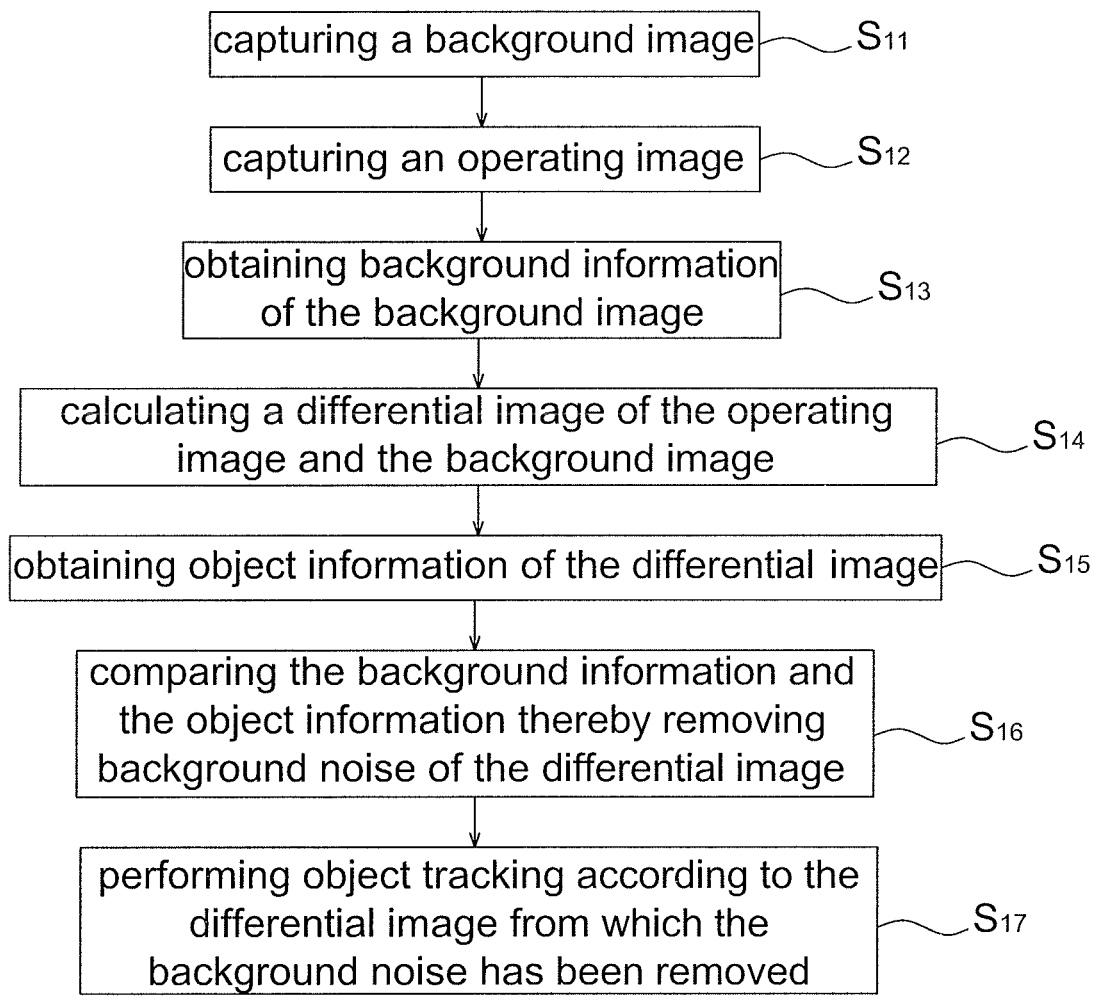
FIG. 3 shows a flow chart of the operating method of the object tracking device according to an embodiment of the present disclosure.
Figure 4:
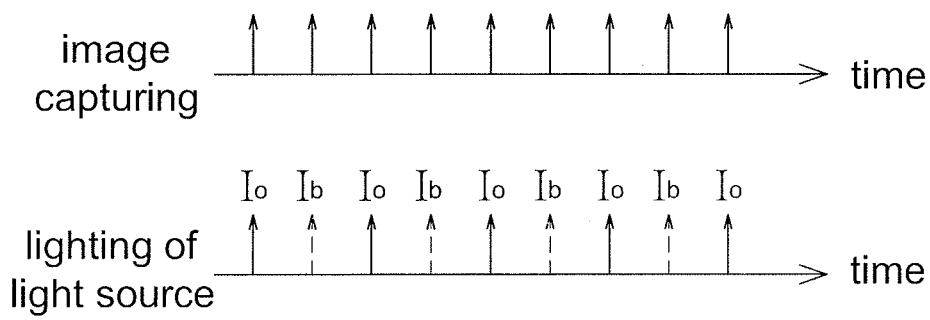
FIG. 4 shows a schematic diagram of the image capturing and the lighting of the light source of the object tracking device according to the embodiment of the present disclosure.

Referring to FIG. 2, it shows a schematic block diagram of the object tracking device according to an embodiment of the present disclosure. The object tracking device 1 includes a touch surface 10, a light source 11, an image sensor 12, a first storage unit 13, a processing unit 14 and a second storage unit 15. The object tracking device 1 is configured to perform the object tracking on at least one object which is approaching or in contact with the touch surface 10 and to output a tracking signal, wherein the object may be a finger 7, a touch pen or the like. The object tracking device 1 may further include a transmission interface configured to output the tracking signal to a corresponding electronic device or equipment.

The touch surface 10 may be made of suitable materials and is preferably transparent to the light emitted from the light source 11. In other embodiments, the touch surface 10 may further include a filter, preferably a bandpass filter, to allow the light emitted by the light source 11 to pass through and block other light spectrums so as to eliminate the interference from ambient light.

The light source 11 may include at least one light emitting diode, laser diode or other suitable light sources. The light source 11 preferably emits red light, infrared light or other invisible light at a lighting frequency so as to illuminate the finger 7.

The image sensor 12 may include a CCD image sensor, a CMOS image sensor or other sensors capable of sensing optical energy. The image sensor 12 is configured to detect light energy reflected from the finger 7 and passing through the touch surface 10 so as to output an operating image Io when the light source 11 is being turned on and output a background image Ib when the light source 11 is being turned off (described later).

The first storage unit 13 is configured to save the background image Ib outputted from the image sensor 12, image data outputted from the processing unit 14 and other parameters needed in calculation, e.g. the differential image, background information, object information, a size threshold, a distance threshold, at least one intensity threshold and so on (described later).

The processing unit 14 is configured to obtain background information from the background image Ib, to calculate a differential image (Io−Ib) of the operating image Io and the background image Ib, to obtain object information from the differential image (Io−Ib), to identify at least one object in the differential image (Io−Ib), and to compare the background information and the object information thereby removing background noise; for example, removing an invalid object, which is associated with the background information and smaller than a size threshold, in the differential image (Io−Ib); i.e. the invalid object is identified as the background noise, wherein the background information may include a background object position of at least one background object in the background image Ib; and the object information may include an object position of at least one object in the differential image (Io−Ib). In this embodiment, the processing unit 14 identifies at least one pixel area in the differential image (Io−Ib) having an intensity larger than an intensity threshold as the at least one object, or identifies at least one pixel area in the differential image (Io−Ib) having an intensity larger than an intensity threshold and larger than a predetermined size (for example, but not limited to, 3 pixels) as the at least one object, and identifies at least one pixel area having an intensity larger than an intensity threshold and smaller than the predetermined size as noise. When the at least one object is identified, the processing unit 14 is further configured to compare the background information with the object information so as to remove the background noise.

In this embodiment, as the background object moves between successive images, the moving background noise may not be totally removed only by calculating the differential image (Io−Ib) of the operating image Io and the background image Ib. Therefore, in this embodiment when a distance of the object position of an object from the background object position is smaller than a distance threshold and a size of the object is smaller than a size threshold, the processing unit 14 identifies the object as the background noise and removes the object. In other words, when a distance of the object position of an object from the background object position is smaller than a distance threshold, the object is defined to be associated with the background information herein and the object is treated as an invalid object.

When the invalid object is removed, the processing unit 14 then performs object tracking according to the differential image from which the invalid object has been removed; e.g. performing the object tracking according to an object whose object position from the background object position is larger than the distance threshold. Accordingly, as the noise caused by the moving background object is totally eliminated, the accuracy of the object tracking is effectively improved.

The second storage unit 15 is configured to save a predetermined background image, which is a background image captured in a starting procedure of the object tracking device 1, or when the object tracking device 1 receives an update command (e.g. updating the background image) or detects an unusual object; i.e. in these procedures the object contained in the image captured by the image sensor is background noise so that the processing unit 14 may calculate, before calculating the differential image, a differential background image of the background image and the predetermined background image to be served as the background image for calculating the differential image. It should be mentioned that in other embodiments the object tracking device 1 may not include the second storage unit 15 such that the processing unit 14 needs not to calculate the differential background image of the background image and the predetermined background image before calculating the differential image. In another embodiment, the first storage unit 13 and the second storage unit 15 may be combined as a single storage unit.

Next, details of the operating method of the object tracking device according to an embodiment of the present disclosure are described hereinafter, which includes the steps of: capturing a background image with an image sensor when a light source is being turned off (Step $S_{11}$); capturing an operating image with the image sensor when the light source is being turned on (Step $S_{12}$); obtaining background information of the background image with a processing unit (Step $S_{13}$); calculating a differential image of the operating image and the background image with the processing unit (Step $S_{14}$); obtaining object information of the differential image with the processing unit (Step $S_{15}$); comparing the background information and the object information thereby removing background noise of the differential image (Step $S_{16}$); and performing object tracking according to the differential image from which the background noise has been removed (Step $S_{17}$), wherein the background image and the differential image may be saved in a storage unit.

Referring to FIGS. 2 to 5D, FIG. 4 shows a schematic diagram of the image capturing and the lighting of the light source of the object tracking device according to the embodiment of the present disclosure; and FIGS. 5A-5D show schematic diagrams of the operating method of the object tracking device according to the embodiment of the present disclosure.

In this embodiment, the light source 11 emits light at a lighting frequency and the image sensor 12 successively captures images at a sampling frequency. In order to eliminate the interference from ambient light, the sampling frequency may be arranged to be higher than the lighting frequency such that the image sensor 12 may capture images corresponding to the turning on and the turning off of the light source 11. For example, the image sensor 12 may capture and output the operating image Io when the light source 11 is being turned on (e.g. shown by solid arrows in FIG. 4), and may capture and output the background image Ib when the light source 11 is being turned off (e.g. shown by dotted arrows in FIG. 4).

Figure 5A:
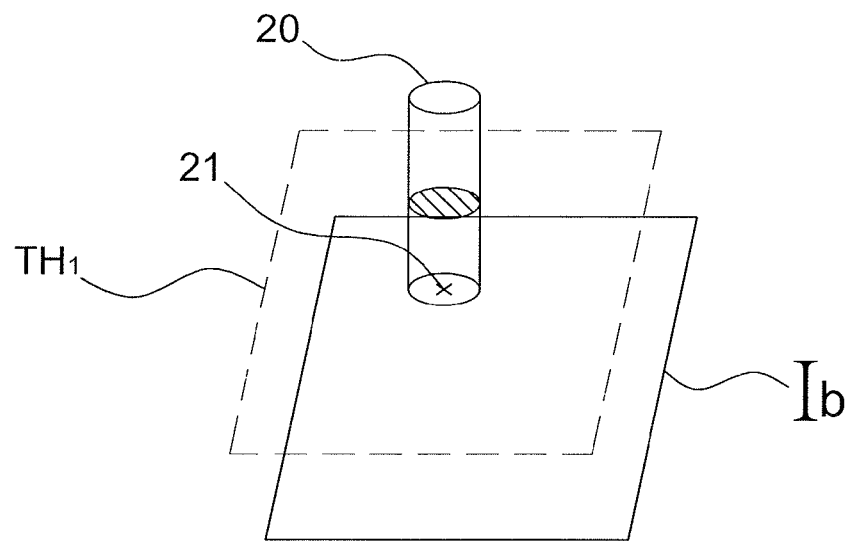
FIGS. 5A-5D show schematic diagrams of the operating method of the object tracking device according to the embodiment of the present disclosure.

Step $S_{11}$: The image sensor 12 captures and outputs a background image Ib (as shown in FIG. 5A) when the light source 11 is being turned off, and the background image Ib may be saved in the first storage unit 13, wherein it is assumed herein that the background image Ib contains only one background object 20.

Figure 5B:
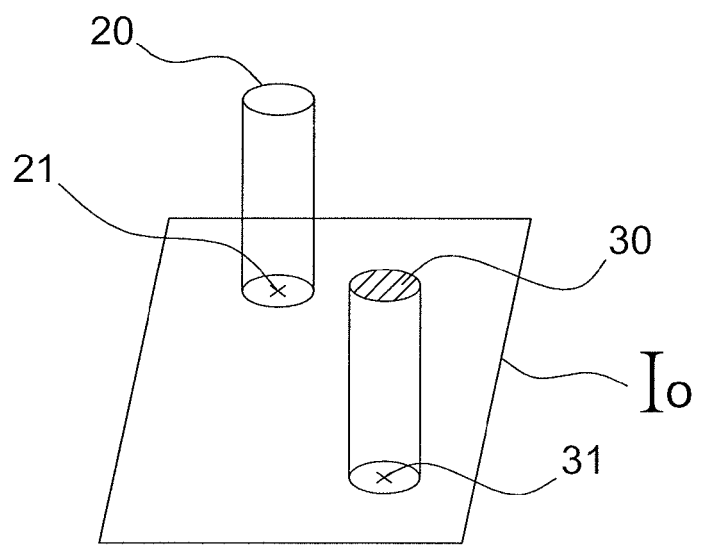

Step $S_{12}$: Then, the image sensor 12 captures and outputs an operating image Io (as shown in FIG. 5B) when the light source 11 is being turned on, wherein it is assumed herein that the operating image Io contains the background object 20 and an object 30. As the image sensor 12 sequentially transmits image data, the operating image Io may not be saved in the first storage unit 13 and may be directly transmitted to the processing unit 14 for being processed.

Step $S_{13}$: The processing unit 14 obtains background information of the background image Ib saved in the first storage unit 13, and the background information is also saved in the first storage unit 13, wherein the background information may include a background object position of at least one background object in the background image Ib. For example, the processing unit 14 may identify a pixel area in the background image Ib having an intensity larger than an intensity threshold $TH_1$ (previously saved in the first storage unit 13) as a background object 20, which has a background object position 21. The background object position 21 may be a center position, a gravity center position, an edge position or other predetermined positions of the background object 20. It should be mentioned that the Step $S_{13}$ may be performed early than, later than or together with the Step $S_{12}$.

Figure 5C:
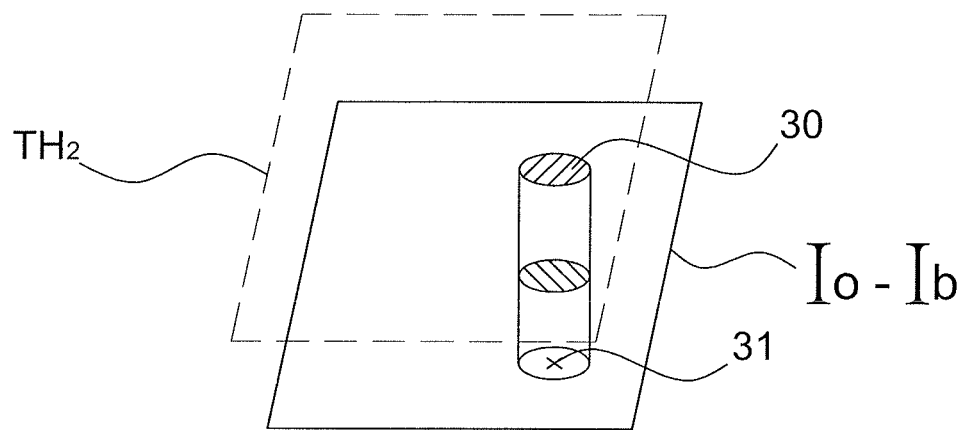
Figure 5D:
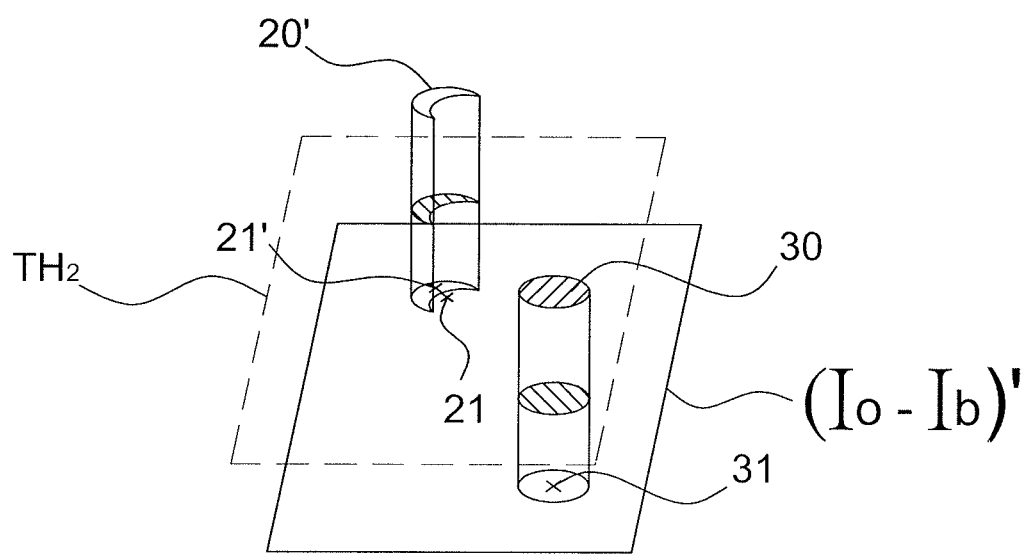

Step $S_{14}$: The processing unit 14 then calculates a differential image (Io−Ib) of the operating image Io and the background image Ib, and the differential image (Io−Ib) is saved in the first storage unit 13. In one embodiment, the differential image (Io−Ib) may overwrite the memory space saving the background image Ib in the first storage unit 13 so as to reduce the memory capacity of the first storage unit 13, but not limited thereto. In this embodiment, if the background object 20 has a fixed object position, the background object 20 is totally removed by calculating the differential image (Io−Ib) and only the object 30 is left (as shown in FIG. 5C). However, when an object position of the background object 20 changes with time, the differential image (Io−Ib)' may contain a part of the background object 20' (as shown in FIG. 5D), wherein a shape of the background object 20' herein is only exemplary.

Step $S_{15}$: The processing unit 14 obtains object information of the differential image (Io−Ib)' in the first storage unit 13, and the object information is saved in the first storage unit 13, wherein the object information may include an object position of at least one object in the differential image (Io−Ib)'. For example, the processing unit 14 may identify a pixel area in the differential image (Io−Ib)' having an intensity larger than an intensity threshold $TH_2$ (previously saved in the first storage unit 13) as an object; e.g. objects 30 and 20' respectively having an object position 31 and 21' are shown herein, wherein the object positions 31 and 21' may be a center position, a gravity center position, an edge position or other predetermined positions of the objects 30 and 21' respectively. As mentioned above, if the object tracking device further includes a second storage unit 15 configured to save a predetermined background image, the processing unit 14 may firstly calculate a differential background image of the background image Ib and the predetermined background image to be served as the background image before calculating the differential image (Io−Ib)'.

Step $S_{16}$: The processing unit 14 then compares the background information with the object information so as to remove background noise. In this embodiment, when an object (e.g. 20') is associated with the background information, e.g. a distance of the object position (e.g. 21') of the object 20' from the background object position (e.g. 21) is smaller than a distance threshold and a size of the object 20' is smaller than a size threshold, the processing unit 14 identifies the object (e.g. 20') is associated with the background information and belong to the background noise or invalid object such that the object (e.g. 20') is removed, wherein the distance threshold and the size threshold may both be previously saved in the first storage unit 13.

Step $S_{17}$: Finally, the processing unit 14 performs the object tracking according to the differential image from which the background noise (or the invalid object) has been removed: i.e. the processing unit 14 performs the object tracking according to the object (e.g. 30) whose object position (e.g. 31) from the background object position (e.g. 21) is larger than a distance threshold so as to eliminate the interference from the moving background noise thereby improving the accuracy of the object tracking. In the embodiment of the present disclosure, when a distance of the object position of an object from the background object position is larger than the distance threshold, the object is identified as the finger image.

It is appreciated that, in FIGS. 5A-5D, altitudes of the background object 20, the invalid object 20' and the object 30 respectively represent the intensities thereof so as to be compared with the intensity thresholds $TH_1$ and $TH_2$. The background object 20, the invalid object 20' and the object 30 may have different intensities, areas, shapes and positions, and are not limited to those shown in FIGS. 5A-5D. In addition, the intensity thresholds $TH_1$ and $TH_2$ may or may not be identical.

As mentioned above, the conventional optical object tracking device is only suitable to be applied to fixed devices since it can not totally eliminate the interference from the moving ambient light. Therefore, the present disclosure further provides an object tracking device (FIG. 2) and an operating method thereof (FIG. 3) that may effectively eliminate the interference from the moving ambient light even though it is applied to the movable apparatuses or equipments, such as a vehicle or a portable electronic device, thereby improving the accuracy of the object tracking.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An object tracking device, comprising:
a light source configured to emit light at a lighting frequency;
an image sensor configured to output an operating image when the light source is being turned on and output a background image when the light source is being turned off; and
a processing unit configured to
obtain background information from the background image, wherein the background information is a background object position of at least one background object in the background image,
calculate a differential image of the operating image and the background image,
identify at least one object in the differential image, and
remove an invalid object, which has a distance from the background object position smaller than a distance threshold and has a size smaller than a size threshold, from the differential image.

2. The object tracking device as claimed in claim 1, wherein the object tracking device is disposed on a vehicle or a portable electronic device.

3. The object tracking device as claimed in claim 1, wherein the processing unit is configured to identify at least one pixel area in the differential image having an intensity larger than an intensity threshold as the at least one object.

4. The object tracking device as claimed in claim 1, further comprising a first storage unit configured to save the background image, the differential image, the background information and the size threshold.

5. The object tracking device as claimed in claim 1, further comprising a second storage unit configured to save a predetermined background image,
wherein before calculating the differential image, the processing unit is configured to
calculate a differential background image between the background image and the predetermined background image, and
use the differential background image for calculating the differential image.

6. The object tracking device as claimed in claim 5, wherein the predetermined background image is captured in a starting procedure of the object tracking device, or when the object tracking device receives an update command or detects an unusual object.

7. An object tracking device, comprising:
a light source configured to emit light;
an image sensor configured to output a first image when the light source is being turned on and output a second image when the light source is being turned off; and
a processing unit configured to
obtain background information from the second image, wherein the background information is a background object position of at least one background object in the second image,
calculate a differential image of the first image and the second image,
obtain object information from the differential image, wherein the object information is an object position of at least one object in the differential image, and
compare the background information and the object information to identify an object as background noise when a distance of the object position of the object from the background object position is smaller than a distance threshold and a size of the object is smaller than a size threshold, thereby removing background noise.

8. The object tracking device as claimed in claim 7, wherein the object tracking device is disposed on a vehicle or a portable electronic device.

9. The object tracking device as claimed in claim 7, further comprising a first storage unit configured to save the second image, the differential image, the background information and the object information.

10. The object tracking device as claimed in claim 7, further comprising a second storage unit configured to save a predetermined second image,
wherein before calculating the differential image, the processing unit is configured to
calculate a differential second image between the second image and the predetermined second image, and
use the differential second image for calculating the differential image.

11. The object tracking device as claimed in claim 10, wherein the predetermined second image is captured in a starting procedure of the object tracking device, or when the object tracking device receives an update command or detects an unusual object.

12. An operating method of an object tracking device, comprising:
capturing, by an image sensor, a background image when a light source is being turned off;

capturing, b the image sensor an operating image when the light source is being turned on;

obtaining, by a processing unit, background information of the background image, wherein the background information is a background object position of at least one background object in the background image;

calculating, by the processing unit, a differential image of the operating image and the background image;

obtaining, by the processing unit, object information of the differential image, wherein the object information is an object position of at least one object in the differential image;

comparing, by the processing unit, the background information and the object information to identify an object as background noise when a distance of the object position of the object from the background object position is smaller than a distance threshold and a size of the object is smaller than a size threshold; and removing, by the processing unit, the background noise of the differential image.

13. The operating method as claimed in claim 12, further comprising:

performing object tracking according to the differential image from which the background noise has been removed.

14. The operating method as claimed in claim 12, further comprising, before calculating the differential image:

calculating a differential background image between the background image and a predetermined background image, wherein the differential background image is for calculating the differential image.

\* \* \* \* \*